Feb. 7, 1939.   T. L. FARNHAM   2,146,537
AUTOMATIC FEED CONTROL VALVE
Filed Feb. 3, 1936   2 Sheets-Sheet 2
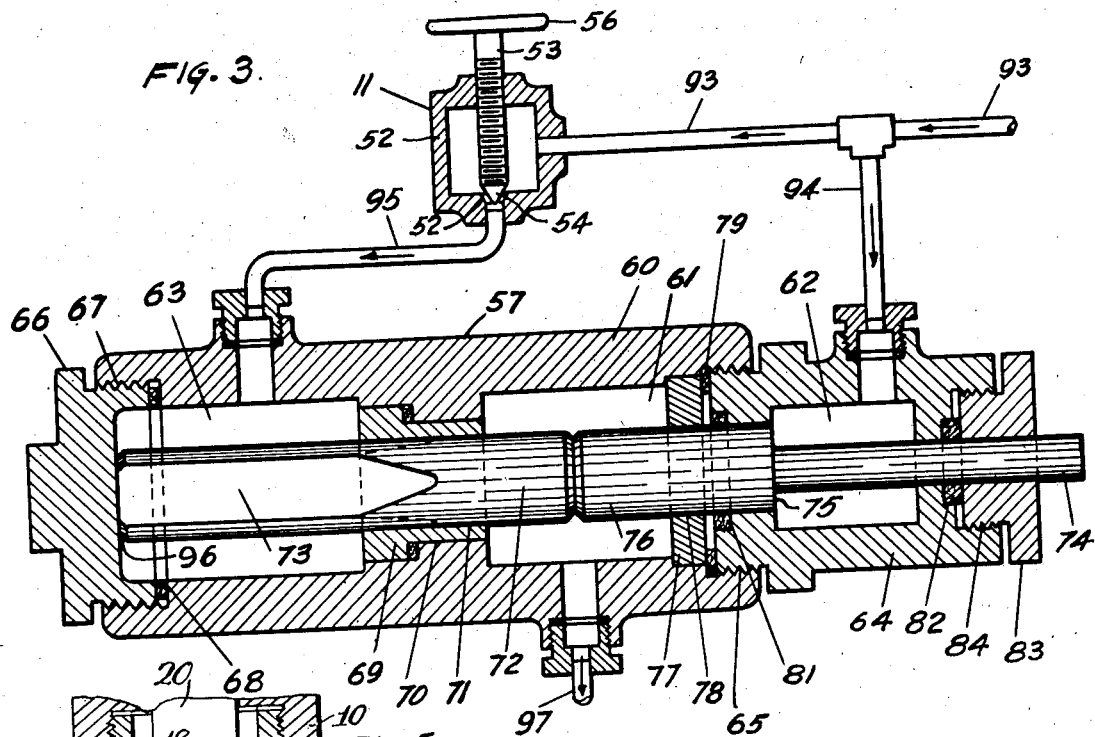
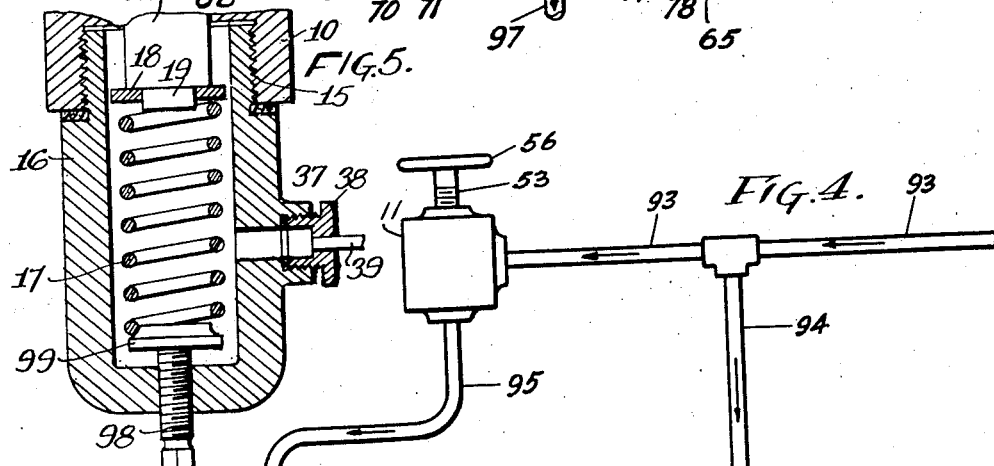
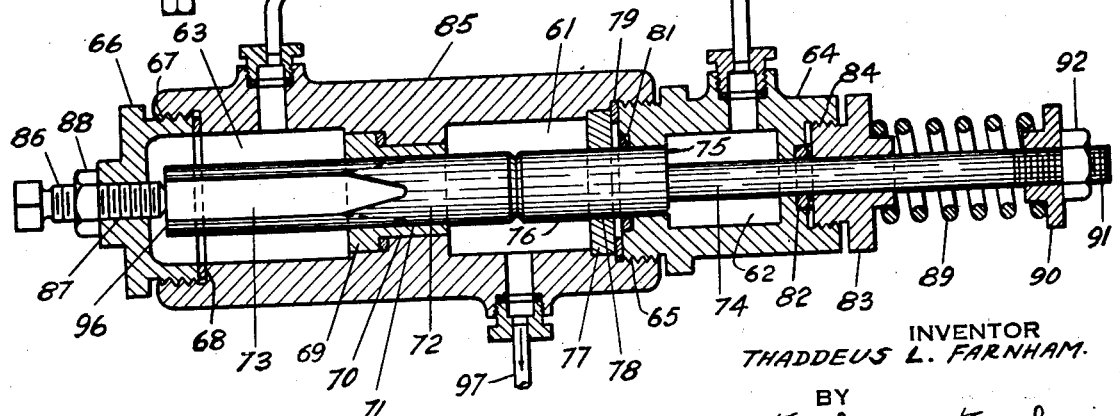
INVENTOR
THADDEUS L. FARNHAM.
BY
Toulmin & Toulmin
ATTORNEYS.

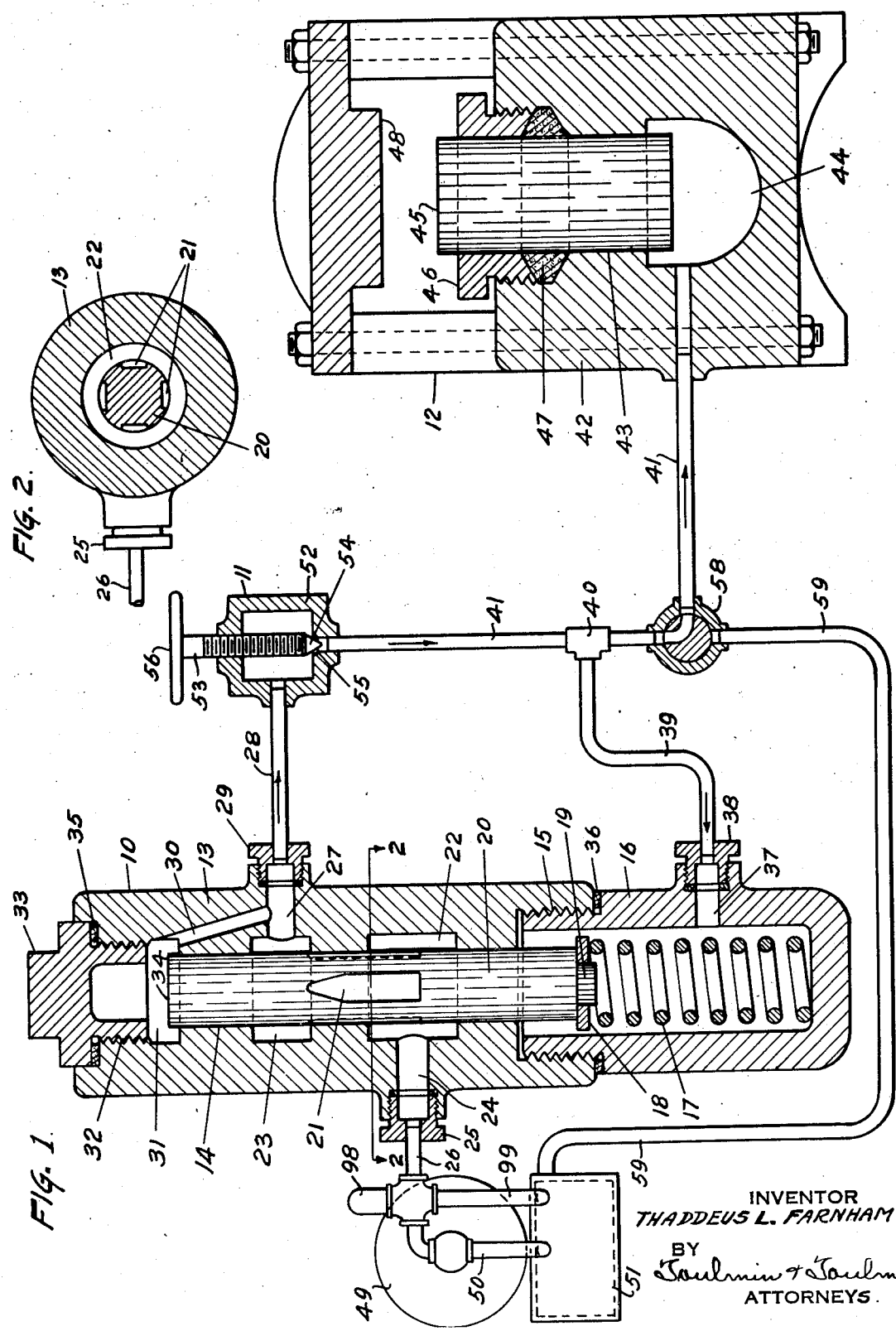

Patented Feb. 7, 1939

2,146,537

UNITED STATES PATENT OFFICE 2,146,537

AUTOMATIC FEED CONTROL VALVE

Thaddeus L. Farnham, Pittsburgh, Pa., assignor to The Hydraulic Press Corporation, Inc., Wilmington, Del., a corporation of Delaware Application February 3, 1936, Serial No. 62,078

8 Claims. (Cl. 137—153)

This invention relates to hydraulic valves, and in particular, to automatic feed control valves for use in hydraulic circuits.

One object of this invention is to provide a hydraulic feed control valve adapted, in cooperation with a choke, to provide a constant flow of pressure fluid to give a constant speed to a hydraulic ram, regardless of the resistance encountered by that ram.

Another object is to provide a hydraulic valve having a plunger movable in one direction by a predetermined force, and in the opposite direction by pressure fluid in the hydraulic circuit in which it is used, the body of the valve having channels for the passage of fluid when the plunger is in a suitable position.

Another object is to provide such a valve having differential areas at the opposite ends of its plunger so that the valve will provide a predetermined control of the pressure fluid from a source of pressure fluid when a choke is placed in the line connecting the opposite ends of the valve plunger.

Another object is to provide a hydraulic valve having a plunger urged in one direction by mechanical means, such as a spring, and in the opposite direction by the pressure of the fluid in the circuit, this pressure resulting from the excess pressure created by the presence of a choke so that the pressure drop across the choke is determined by the spring tension, and provides a constant speed of flow of oil through the choke, regardless of the resistance encountered by the hydraulic ram.

Another object is to provide a hydraulic valve having a plunger with a piston head area and a differential piston area, together with means for applying an adjustable force to oppose the motion of the plunger and regulate the pressure at which the valve becomes operative.

Another object is to provide a valve of the foregoing description, in which a movable stop is provided for limiting the distance to which the plunger will move within the valve casing.

In the drawings:

Figure 1 is a diagrammatic sectional view of the hydraulic circuit and valve of this invention.

Figure 2 is a cross section along the line 2—2 of Figure 1.

Figure 3 is a sectional view of a modified circuit, wherein the valve is provided with a plunger having a differential piston area thereon.

Figure 4 is a view of a hydraulic circuit containing a valve similar to that of Figure 3, but with means for adjusting the pressure at which the valve becomes operative.

Figure 5 is a fragmentary sectional view of a modification of the lower portion of the valve shown in Figure 1.

Referring to the drawings in detail, Figure 1 shows a hydraulic circuit containing a control valve, generally designated 10, connected to an adjustable choke, generally designated 11, and a hydraulic machine of the hydraulic ram type, generally designated 12. The representations of the choke 11 and hydraulic machine 12 have been simplified in order to clarify the disclosure, it being understood that such devices in practice are of somewhat complicated construction.

The control valve 10 consists of a casing 13 having a main bore 14 therethrough, and provided with a threaded counterbore 15. Threaded into the counterbore 15 is a hollow cap 16, arranged for the reception of a coil spring 17 which acts against a washer 18 abutting the reduced end 19 of the valve plunger 20. The latter extends through the bore 14 and is provided with interfluted channels 21, arranged to provide communication between a central chamber 22 and a side chamber 23. A passage 24 through the walls of the casing 13 provides for the admission to or discharge of fluid from the central chamber 22, the hollow plug 25 being arranged to provide a junction for the pipe 26 for this purpose. The side chamber 23 is likewise provided with a passage 27, communicating with a similar pipe 28 secured thereto by the junction plug 29, the pipe 28 being connected, in the circuit shown in Figure 1, to the adjustable choke 11.

An auxiliary passage 30 leads from the passage 27 to the end chamber 31 of the casing 13. The end chamber 31 is provided with a threaded portion 32, arranged to receive a threaded plug 33 for closing the end of the casing 13. The valve plunger 20 within the end chamber 31 is provided with a piston head area 34, which is adapted to be acted upon by fluid reaching the chamber 31 by way of the passages 27 and 30. A gasket 35 around the plug 33, and a similar gasket 36 around the cap 16 provide fluid-tight connections at the junctions of the parts between which they are arranged.

The cap 16 is provided with a passage 37 having a threaded plug 38 forming a junction for the pipe 39 leading to a junction 40 with the pipe 41, which connects the choke 11 with the hydraulic machine 12. The hydraulic machine 12, in the embodiment shown, consists of a hydraulic press having a frame 42 with a cylinder bore 43 and a chamber 44 adapted to receive one end of a hydraulic ram 45. A gland 46, serving to compress a packing 47, prevents the escape of fluid from the chamber 44. A press head 48 serves to receive the thrust of the ram 45 when acted upon by fluid within the chamber 44. Suitable valve means, such as the three-way valve 58, is inserted in the line 41 to provide for passage of the fluid from the chamber 44 to the tank 51 by way of the line 59. On the return stroke this construction permits the descent of the ram 45 under gravity more rapidly than by causing the fluid to return by the same route which it followed in coming from the source of pressure.

As a source for discharging pressure fluid into the pipe 26 a hydraulic pump 49, of any suitable type, may be used. The pump 49 has a suction line 50 adapted to withdraw fluid from a suitable fluid tank, such as the tank 51, in the base of the pump 49, or else to return the fluid thither in the reversed position of the pump.

A relief valve 98 is arranged in the line 26, between the pump 49 and the automatic control valve 10, and discharges into the discharge line 99 when the pressure in the line 26 exceeds the predetermined amount for which the relief valve 98 is set. The relief valve 98 may be of any suitable and conventional type known to those skilled in the art.

The choke 11 consists of a casing 52 having a threaded valve member 53 with a conical point 54, adapted to enter a corresponding conical seat 55 communicating with the pipe 41. The casing 52 itself communicates with the pipe 28. As the valve member 53 is rotated, as the operator turns the hand wheel 56 attached thereto, the opening between the conical point 54 and seat 55 becomes larger or smaller, thereby varying the choking effect of the device.

In the operation of the circuit shown in Figure 1, fluid pressure is discharged into the central chamber 22 from the pipe 26, and passage 24. The spring 17 normally urges the valve plunger 20 toward the end plug 33 so that the channels 21 interconnect the chambers 22 and 23 and permit fluid to flow from the chamber 22, through the channels 21, the chamber 23, the passage 27 and the pipe 28 through the adjustable choke 11 and the pipe 41, into the ram chamber 44. The fluid also passes along the passage 30 into the end chamber 31 before reaching the choke 11, whereas beyond the choke 11 fluid passes along the pipe 39 into the chamber within the end cap 16. As the source of pressure fluid continues to discharge into the valve 10, the pressure piles up in the pipe 28, due to the action of the adjustable choke 11, and backs up into the chamber 31 through the passage 30. This pressure acts upon the piston area 34 and shifts the valve plunger 20 when it becomes sufficiently strong to overcome the thrust of the spring 17. As the valve plunger 20 moves downwardly, under this action, the intercommunication between the chambers 22 and 23, through the channels 21, is shut off, thereby preventing further discharge of pressure fluid until this pressure is reduced. When this occurs the pressure source may be caused to discharge through a relief valve, or any other known means of relieving the pressure may be used.

As the pressure fluid enters the ram chamber 44 it acts upon the ram 45 and causes it to move against the workpiece. As the resistance increases a back pressure obviously accumulates within the press chamber 44, and is transmitted backwardly through the pipes 41, 39 and 28 into the chamber within the end cap 16, and likewise into the end chamber 31. This pressure acts upon opposite ends of the valve plunger 20, hence, neutralizes itself. Accordingly, it makes no difference whether the resistance is zero, or whether it is any amount up to the total pressure available. The rate of flow in the circuit is determined solely by the pressure drop across the adjustable choke, and this in turn, is determined by the tension of the spring 17 and by the opening between the conical point 54 and seat 55 of the adjustable choke 11. A constant speed or constant flow of fluid through the adjustable choke is therefore provided, regardless of the resistance encountered by the ram 45 and transmitted backwardly from the ram chamber 44. The only pressure tending to close the valve plunger 20 is that of the pressure which piles up behind the adjustable choke 11, and which acts upon the piston head area 34 to move the valve plunger 20 and compress the spring 17.

As a modification of the construction shown in Figure 1, the means shown in Figure 5 may be provided for adjusting the thrust of the spring 17. This can be accomplished by providing for moving the threaded cap 16 in or out, or else a set screw 98 with a disc 99 upon the end thereof may be provided in the end of the end cap 16; this disc 99 engages the end of the spring 17 to compress the latter and adjust its thrust. In such a case, a fixed choke may be used in place of the adjustable choke 11.

The modified form of valve, generally designated 57, shown in Figure 3, consists of a casing 60 with a central chamber 61 and end chambers 62 and 63, respectively. The end chamber 62 is contained within an end cap 64, threaded into an aperture 65 in the valve casing 60. A threaded plug 66 similarly enters a threaded aperture 67 to close the opening in the end chamber 63, a gasket 68 preventing the escape of fluid. A bushing 69, arranged within a bore 70, interconnecting the chambers 61 and 63, contains a bore 71 adapted to receive a valve plunger 72 for reciprocation therein. The valve plunger 72 is provided with fluted channels 73 at the end which enters the chamber 63, and is similarly provided with a reduced portion 74 at its opposite end. The reduced portion 74 creates an annular differential piston head area 75 as a result of the annular shoulder between it and the main body portion 76 of the valve plunger 72.

A disc 77 with a bore 78 serves to permit the passage of the valve plunger 72, and is held in place by a gasket 79, compressed by the end of the end cap 64 which is threaded into the threaded aperture 65. An oil seal ring 81 serves to prevent the leakage of fluid along the body of the valve plunger 72. A similar oil seal ring 82, held in place by the plug 83 threaded into the aperture 84, serves to prevent leakage along the reduced portion 74 which passes therethrough.

The modified valve shown in Figure 4 is similar to that shown in Figure 3, and similar parts bear similar reference numerals. The valve, generally designated 85, of Figure 4, however, is provided with a set screw 86 threaded through the aperture 87 in the end plug 66, and locked in a fixed position by the locknut 88. This set screw 86 limits the travel of the valve plunger 72 and prevents the full closing thereof so as to give a higher close-up speed. At the opposite end of the valve plunger 72 and around the external portion of the reduced portion 74 is arranged a coil spring 89, adapted to be compressed by a nut 90 threaded onto the end 91 of the reduced portion 74. A locknut 92 holds the nut 90 in its adjusted position.

A circuit containing the modified control valves 57 and 85, the pressure pipe 93, leading from the source of pressure fluid to the choke 11, is provided with a branch 94 leading to the chamber 62 of the differential piston area 75. Beyond the choke 11 the pipe 95 leads to the end chamber 63, where the pressure may act upon the end 96 of the valve plunger 72.

The operation of the device of this invention may also be illustrated by taking a concrete example. The relationship between the pressure drop and the volume of fluid passing through the device is a simple mathematical equation. Assuming that the head of pressure in feet is called H, then the velocity of flow through an orifice equals the square root of 2GH in feet per second, where G is the gravitational constant.

If the area of the orifice is A square feet, then the volume passing the orifice per unit time is A times the square root of 2GH in cubic feet per second. H would be the pressure differential of the orifice in an ordinary case. The pressure differential in the present invention is produced by the difference in area between the chamber 62 and the chamber 63. For example, if the source has a pressure of 1000 pounds per square inch, and the area of the plunger 73 is 10 square inches while the area of the plunger 74 is 2 square inches, then the differential area would be 8 square inches and the differential pressure would be 1000 times 2, divided by 10, or 200 pounds per square inch. Therefore, the pressure in the chamber 63 would have to be 200 pounds per square inch lower than in the chamber 62 to balance the device.

This differential pressure of 200 pounds per square inch produces a flow through the choke 11 according to the well known formula, the velocity being the square root of 2GH when H is the head of pressure in feet, this being about 400 feet as equivalent to 200 pounds per square inch. By means of the hand wheel 56 the area can then be adjusted and the flow in cubic feet per second likewise adjusted, as it can be assumed that the source of the pressure coming in by way of the pipe 93 is reasonably constant. Under these conditions, therefore, the pressure differential will also be constant and will produce a constant flow in cubic feet per second through the valve 11, unless the latter is set for a fixed opening. This constant flow of fluid passes through the line 97 to the driven apparatus.

Now then, if there is a change in resistance in the line 97, it will not affect the flow through the choke 11 unless the resistance rises to such an extent as to equal the amount of the impressed pressure minus the differential pressure,—in the example under discussion, 800 pounds per square inch. As long as the pressure in the driven apparatus is less than 800 pounds per square inch its speed will not be affected. For example, assuming that the apparatus starts with zero pressure in the line 97 and 1000 pounds of pressure applied in line 93, this 1000-pound pressure will tend to pass through the choke valve 11 and force the valve stem 73 to the right. As soon as the pressure in the chamber 63 has reached 800 pounds per square inch, in the example under discussion, the valve is balanced and cannot open farther. As the pressure in line 97 rises this pressure tends to back up through the opening in the bushing 70, against the area of the piston 73, and opens it an additional amount. In other words, the pressure in chamber 61 rises and this causes a reduction of the pressure difference between the chambers 63 and 61. This reduction of the pressure difference causes a reduction of flow through the bushing 70, which in turn, creates a tendency for the pressure in the chamber 63 to back up. This pressure will have the tendency to move the piston 73 to the right, and increase the opening until the balanced condition is again established.

In the operation of the modified control valves 57 and 85, the pressure acting upon the differential piston area 75 and the piston head area 96 will maintain the valve plunger 72 in equilibrium when the pressure drop through the choke 11 balances the amount of pressure exerted against the differential piston area 75. As the flow through the choke 11 increases the pressure in the end chamber 63 drops, while the pressure against the differential piston area 75 rises, thereby causing the valve plunger to move to the left, cutting off the flow of fluid into the central chamber 61 through the channels 73. Before this occurs fluid passes from the chamber 61, through the pipe line 97 to the particular machine 12, which the circuit of Figures 3 and 4 is intended to operate.

In the operation of the modified form shown in Figure 4, the differential head 75 is made larger than necessary so that the thrust of the spring 89 may be used to oppose it. The thrust of the spring 89 may be relieved or increased to any extent by moving the nut 90 in the proper direction, thereby giving an adjustment to the relative thrust exerted upon the differential piston area 75, which is necessary to overcome the opposite thrust upon the piston head area 96.

It will be further understood that I may use a diaphragm employing differential pressures on the opposite sides to operate the valve member, in place of the construction described above. This diaphragm-operated valve member enables a quick and accurate movement with a minimum of pressure drop across the choke.

A hydraulic circuit employing the automatic control valve disclosed in the present application is disclosed and claimed in the copending application of Walter Ernst, Ser. No. 62,077, filed February 3, 1936.

It will also be understood that I desire to comprehend within this invention such modifications as come within the scope of the claims and the invention.

Having thus fully described my invention, what I claim as new and desire to secure by Letters Patent, is:

1. A hydraulic control circuit for a hydraulic motor comprising a source of pressure fluid, a valve casing connected thereto, a valve member within said valve casing having passages therealong, said valve member having sliding support at its opposite ends in said valve casing, means for urging said valve member in one direction to open said passages to the flow of fluid, hydraulic connecting means between the opposite ends of said valve member, and a choke arranged to restrict the flow of fluid between said opposite ends.

2. A hydraulic control circuit for a hydraulic motor comprising a source of pressure fluid, a valve casing connected thereto having a plurality of chambers, a channeled valve plunger movable selectively to open and close said channels between two of said chambers, said valve plunger having sliding support at its opposite ends in said valve casing, means for urging said valve plunger in one direction, an end chamber connected to one of said previously mentioned chambers, said valve plunger extending into said end chamber, the pressure therein being adapted to move said valve plunger in the opposite direction, hydraulic connecting means between the opposite ends of said plunger, and a choke arranged within said connecting means.

3. A hydraulic control circuit for a hydraulic ram comprising a source of pressure fluid, a valve casing connected thereto, said valve casing having a plurality of chambers therein, a channeled valve plunger movable selectively to open and close said channels between two of said chambers, said valve plunger having sliding support at its opposite ends in said valve casing, means for urging said valve plunger in one direction, an end chamber connected to one of said previously mentioned chambers, said valve plunger extending into said end chamber, the pressure therein being adapted to move said valve plunger in the opposite direction, hydraulic connecting means between the opposite ends of said plunger, and a choke arranged within said conecting means, said choke including means for adjustably varying the flow of fluid therethrough.

4. A control valve for a hydraulic circuit comprising a casing having a plurality of end chambers and a plurality of intermediate chambers therein, a valve plunger reciprocable through said intermediate chambers into said end chambers, said valve plunger having sliding support at its opposite ends in said valve casing, means in said valve plunger for selectively interconnecting and disconnecting said chambers from communication with one another, means for urging said valve plunger in one direction, said casing having an end chamber arranged to permit the entrance of pressure fluid to urge said valve plunger in the opposite direction, and a choke arranged to restrict the flow of fluid discharged from said valve and said end chamber.

5. A control valve for a hydraulic circuit comprising a casing having a plurality of end chambers and a plurality of intermediate chambers therein, a valve plunger reciprocable through said intermediate chambers into said end chambers, said valve plunger having sliding support at its opposite ends in said valve casing, means in said valve plunger for selectively interconnecting and disconnecting said chambers from communication with one another, means for urging said valve plunger in one direction, said casing having an end chamber arranged to permit the entrance of pressure fluid to urge said valve plunger in the opposite direction, a choke arranged to restrict the flow of fluid discharged from said valve and said end chamber, and means for connecting the opposite sides of said choke with the opposite ends of said valve plunger.

6. A control valve for a hydraulic circuit comprising a casing having a bore with a plurality of end chambers and a plurality of intermediate chambers, a valve plunger reciprocable therein, said valve plunger having sliding support at its opposite ends in said valve casing, means for selectively interconnecting and disconnecting said intermediate chambers through said valve plunger, means associated with one of said end chambers for urging said valve plunger in one direction, and hydraulic connections to the other end chamber to permit the entry of pressure fluid thereto to urge the valve plunger in the opposite direction.

7. A control valve for a hydraulic circuit comprising a casing having a bore with a plurality of end chambers and a plurality of intermediate chambers, a valve plunger reciprocable therein, said valve plunger having sliding support at its opposite ends in said valve casing, means for selectively interconnecting and disconnecting said intermediate chambers through said valve plunger, means associated with one of said end chambers for urging said valve plunger in one direction, and hydraulic connections to the other end chamber to permit the entry of pressure fluid thereto to urge the valve plunger in the opposite direction, said last mentioned end chamber being connected to one of said intermediate chambers.

8. A control valve for a hydraulic circuit comprising a casing having a bore with a plurality of end chambers and a plurality of intermediate chambers, a valve plunger reciprocable therein, said valve plunger having sliding support at its opposite ends in said valve casing, means for selectively interconnecting and disconnecting said intermediate chambers through said valve plunger, means associated with one of said end chambers for urging said valve plunger in one direction, and hydraulic connections to the other end chamber to permit the entry of pressure fluid thereto to urge the valve plunger in the opposite direction, said valve plunger-urging means associated with said first-mentioned end chamber comprising a spring.

THADDEUS L. FARNHAM.